United States Patent [19]

Riley

[11] Patent Number: 4,991,478

[45] Date of Patent: * Feb. 12, 1991

[54] TRIMMING APPARATUS AND METHOD

[75] Inventor: Wayne F. Riley, Warren, Mich.

[73] Assignee: Reflex Trim, Inc., Sterling Heights, Mich.

[ * ] Notice: The portion of the term of this patent subsequent to Nov. 22, 2005 has been disclaimed.

[21] Appl. No.: 386,143

[22] Filed: Jul. 26, 1989

Related U.S. Application Data

[63] Continuation of Ser. No. 166,198, Mar. 10, 1988, abandoned, which is a continuation-in-part of Ser. No. 916,213, Oct. 7, 1986, Pat. No. 4,785,695.

[51] Int. Cl.⁵ .......................... B26D 1/09; B26D 5/16
[52] U.S. Cl. ............................................ 83/49; 83/54; 83/193; 83/588; 83/622; 83/636; 83/694; 83/914
[58] Field of Search .................... 83/13, 49, 52, 54, 56, 83/184, 188, 192, 193, 178, 542, 590, 563, 588, 618, 620, 622, 636, 688, 694, 698, 914

[56] References Cited

U.S. PATENT DOCUMENTS

| | | | |
|---|---|---|---|
| 3,172,327 | 3/1965 | Hazzard | 83/914 |
| 3,461,761 | 8/1969 | Mojonnier | 83/567 |
| 4,125,045 | 11/1978 | Jeremic | 83/590 |
| 4,243,456 | 1/1981 | Cesano | 156/214 |
| 4,583,436 | 4/1986 | Asano | 83/104 |
| 4,633,745 | 1/1987 | Asano | 83/455 |
| 4,785,695 | 11/1988 | Riley | 83/49 |

FOREIGN PATENT DOCUMENTS

| | | | |
|---|---|---|---|
| 211505 | 5/1968 | U.S.S.R. | 83/914 |
| 502682 | 4/1976 | U.S.S.R. | 83/618 |

Primary Examiner—Hien H. Phan
Attorney, Agent, or Firm—Harness, Dickey & Pierce

[57] ABSTRACT

The excess covering material is trimmed from a workpiece using a blade assembly having side by side blade segments with cutting edges aligned with the contour to be cut. A rubber roller applies a longitudinal cutting force to the blade segments in sequential fashion by rolling across the blade segments ends opposite the cutting ends. The blade segments are returned to the noncutting position by a tension wire threaded through a notch in the shaft of each of the blade segments. Cutting pressure is adequate to cut through at least three layers of covering material without scoring the substrate. The rubber roller provides certain resiliency which helps control the cutting pressure.

32 Claims, 9 Drawing Sheets

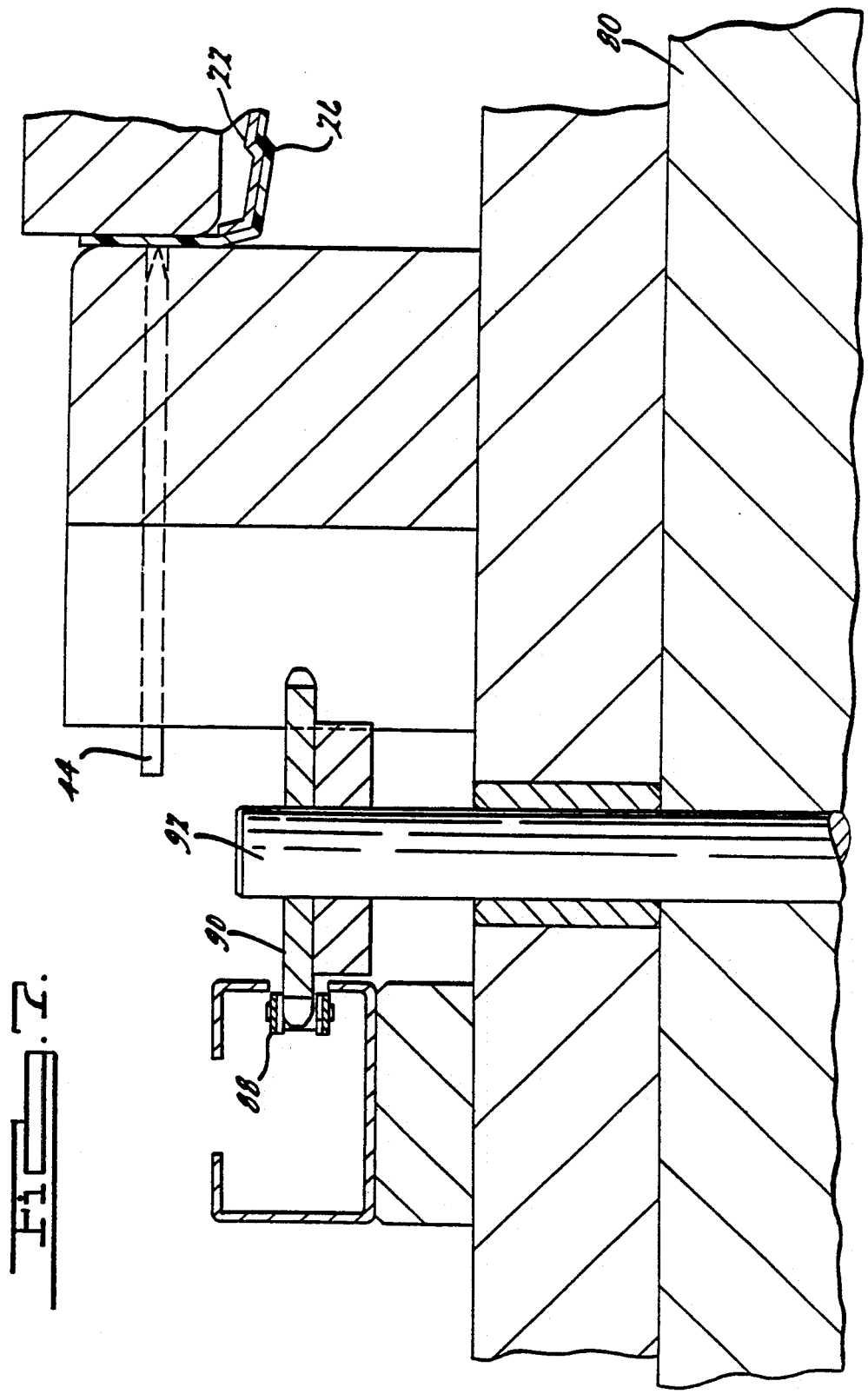

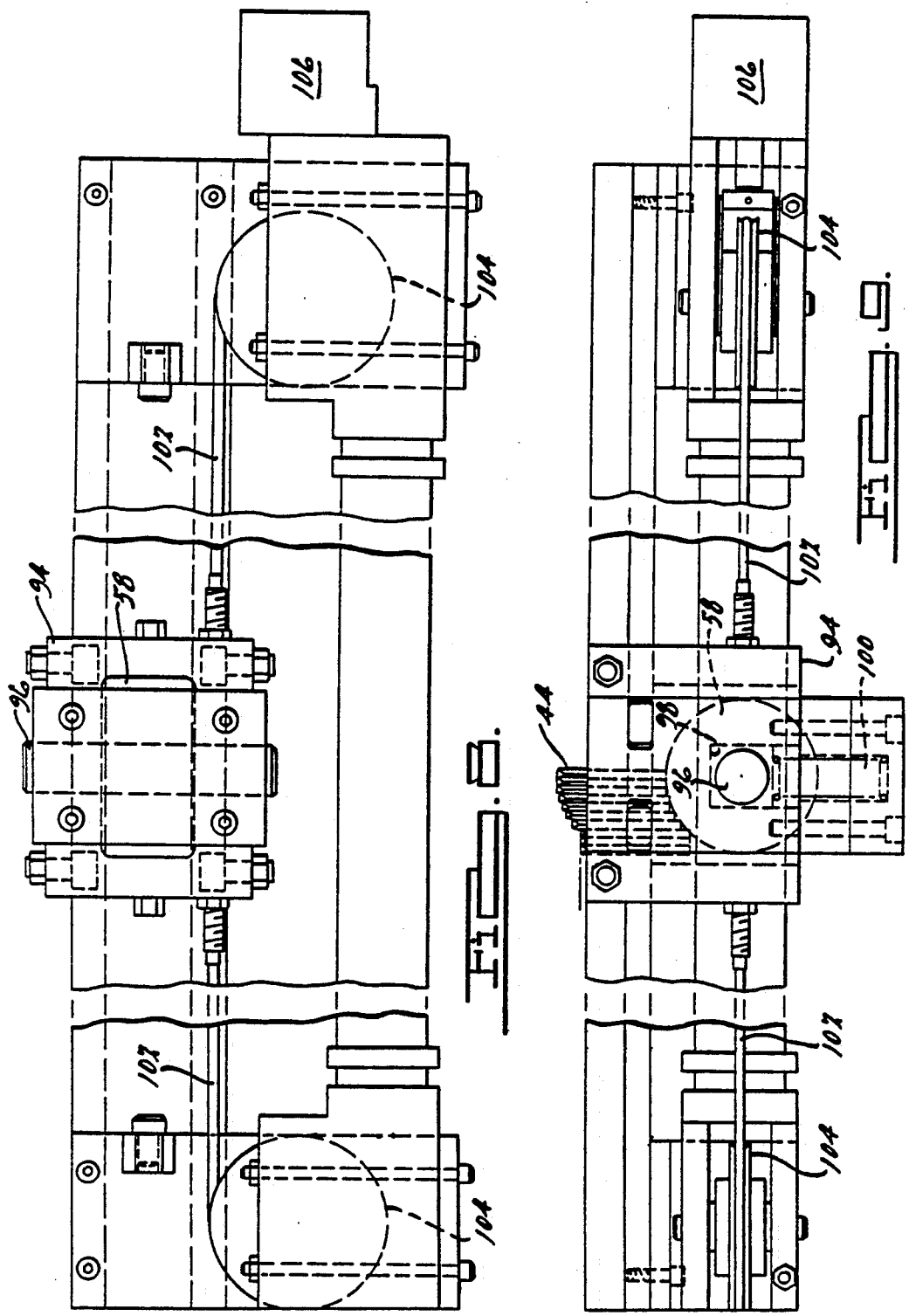

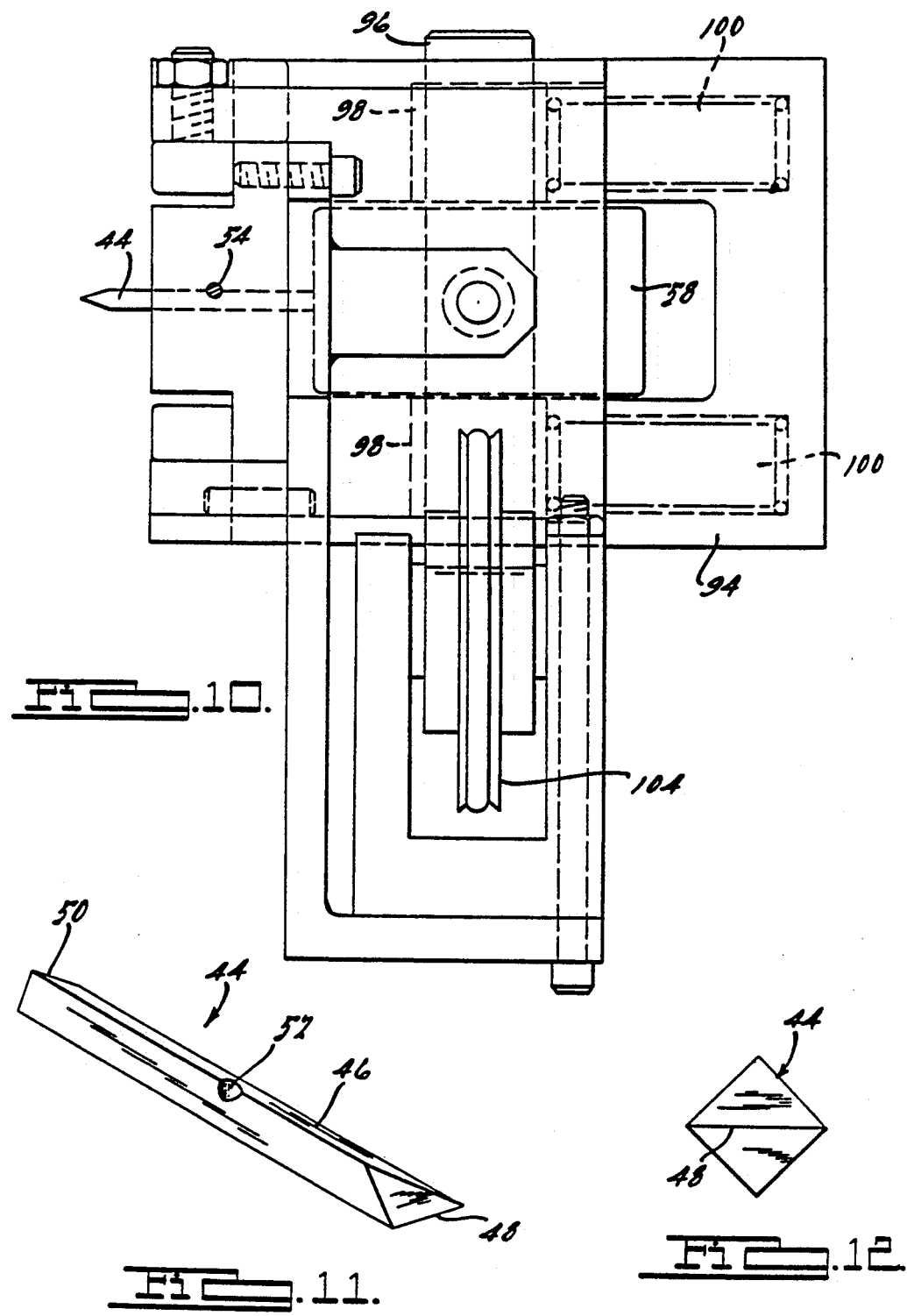

TRIMMING APPARATUS AND METHOD

CROSS-REFERENCE TO RELATED APPLICATION

This is a continuation of U.S. Pat. application Ser. No. 166,198, filed Mar. 10, 1988, entitled "Trimming Apparatus and Method", now abandoned, which is a continuation-in-part of application Ser. No. 916,213 filed Oct. 7, 1986 by Wayne F. Riley, entitled "Trimming Apparatus And Method", now U.S. Pat. No. 4,785,695.

BACKGROUND AND SUMMARY OF THE INVENTION

The present invention relates generally to trim cutting. More particularly, the invention relates to an apparatus and method for trimming cloth, vinyl and plastic from around the periphery or along a contour of a workpiece such as vehicle interior quarter panels, headliners and the like.

Present day automotive interiors are usually manufactured by vacuum forming a vinyl or plastic covering around a substrate of processed wood, cardboard or other natural or synthetic materials. The vacuum forming process involves wrapping the vinyl or plastic covering around the substrate, leaving a certain excess covering to be later trimmed. The vinyl or plastic is then heated and a vacuum is applied to cause the covering to conform closely to and adhere to the substrate. After the heated part has cooled, the edges of the covering must be trimmed so the end product will have a neat appearance. In many cases, the contour of the substrate, which corresponds generally to the contour of the end product, is an irregular or complex-shaped owing to the physical dimensions of the vehicle interior. Because of this complex shape, the edges of the covering may be folded back upon themselves or pleated, meaning that in some places the trimming must be made through several layers of material, whereas in other places the trimming is only through a single layer. Also, in trimming away the excess or offall, care must be taken to avoid cutting into or scoring the substrate. A score in the substrate shows up as a blemish line in the end product and can also structurally weaken the part.

Because of these difficulties, present day manufacturing processes still rely on hand trimming of vehicle interior parts. This adds considerably to the manufacturing time and cost of the vehicle. Punch presses have been used successfully to punch holes through the covering and substrate for mounting door handles, window handles and the like. These punches do not work satisfactorily in trimming operations, because it is difficult to predict where multiple folds in the covering will appear and because it is difficult to properly regulate the cutting force to trim the covering without damaging the substrate.

The present invention overcomes the foregoing difficulties and provides an automated apparatus for trimming along a contour of a workpiece. The apparatus and method encompassed by the invention thus eliminate costly and time consuming hand trimming of vacuum formed vinyl interior parts.

In accordance with the invention, a blade assembly is positionable at least partially along a line defined by the contour to be trimmed. The blade assembly comprises a plurality of blade segments arranged side-by-side and along the line defined by the contour. A means is provided for sequentially pressing the blade segments into cutting contact with the workpiece, thereby causing the blade segments to trim the workpiece. A means is also provided for urging the blade segments out of cutting contact with the workpiece after the trimming has been effected.

The cutting blade assembly comprises a plurality of elongated blade segments, each segment having a longitudinally extending shaft and a cutting blade tip. The segments are substantially greater in length than width, the width being nominally 0.187 inches. The blades segments are positioned side-by-side in order to follow a contour to be trimmed and are individually movable between a resting position and a longitudinally displaced cutting position. Each of the segments has an aperture therein. The apertures are generally aligned with one another when the segments are aligned in the resting position. A tension wire is threaded through the apertures to join the segments together. A spring is connected to the tension wire for placing the tension wire under tension and for thereby causing the segments to return to the resting position after being displaced to the cutting position.

In another preferred embodiment the blade segments are provided with transverse slots which when placed side-by-side define a channel for receiving an elongated force distribution means in the form of a spring steel member. The spring steel member is biased using coil springs such that it is urged in a direction tending to urge the blade segments into the resting position. The spring steel member distributes longitudinal pressure applied when the blade segments are displaced to the cutting position. The distributed forces cause a plurality of adjacent blade segments to make contact with the workpiece prior to cutting. This results in improved performance and reduced force requirements in some applications.

The trimming apparatus employs a roller disposed adjacent to the end of the blade segments opposite the cutting blade. Included is a means for moving the roller along the line of the contour, to cause the roller to sequentially contact the edges of the blade segments. A mechanical or fluid pressure means is provided for applying a force on the roller, to cause the roller to exert longitudinal pressure on the blade segments as the roller is moved along the line of the contour. This cause the roller to sequentially force the blade segments into cutting contact with the workpiece.

The method of cutting is capable of trimming through at least three folds of vinyl, plastic or cloth covering without scoring or damaging the substrate beneath. The blade pressure is preferably on the order of 60 pounds per 100/1,000th of linear width of the cutting blade. A urethane roller provides a resilient surface which takes up excess pressure. The invention can follow curved contours about flat workpieces and also about nonflat workpieces. The invention is thus well adapted for trimming vacuum formed vinyl vehicle interior parts.

For a more complete understanding of the invention, its objects and advantages, reference may be had to the following specification and to the accompanying drawings.

BRIEF DESCRIPTION OF THE DRAWINGS

FIG. 7 is a vertical cross-sectional view taken substantially along the line 7—7 of FIG. 5;

FIGS. 8 and 9 illustrate yet another embodiment of the trimming apparatus;

FIG. 10 illustrates the cutting fixture of the embodiment of FIGS. 8 and 9 in greater detail;

FIG. 11 is a perspective view of a single blade segment in accordance with the invention;

FIG. 12 is an end view of the blade segment of FIG. 11 illustrating the cutting end;

DESCRIPTION OF THE PREFERRED EMBODIMENTS

Figure 1:
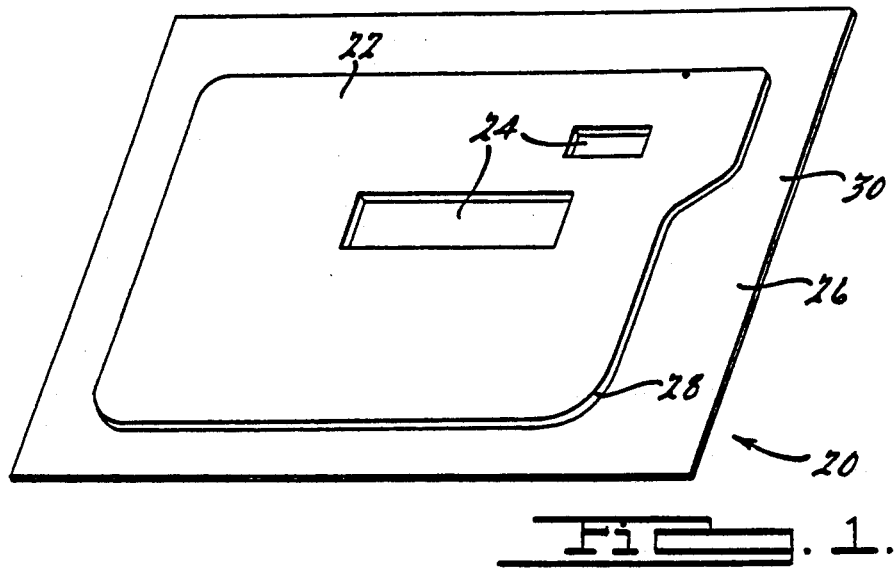
FIG. 1 is a plan view of an exemplary door panel substrate and vinyl covering blank, useful in describing the principles of the invention.

Referring first to FIG. 1, an exemplary door panel workpiece is illustrated at 20. The workpiece comprises a substrate 22, which may have one or more cut out regions 24 to accommodate door handles, arm rests, ashtrays, mirror control knobs and the like. A cloth, plastic, vinyl or other covering material 26 is bonded to the substrate as by vacuum forming. The workpiece of FIG. 1 is shown in the untrimmed state. When trimmed, the workpiece would have the shape defined by the contour 28 of the substrate, with the free or unbonded covering material comprising the excess or offall.

FIG. 1 is somewhat diagrammatic in the sense that the substrate may not be a flat plane but might have a three dimensional contour. Also, during the vacuum forming or bonding process, the excess covering material may be puckered, folded or pleated in the vicinity of the curved portions of contour 28. This folding can often vary considerably from workpiece to workpiece, making automated trimming heretofore difficult to accomplish and unreliable.

Figure 2:
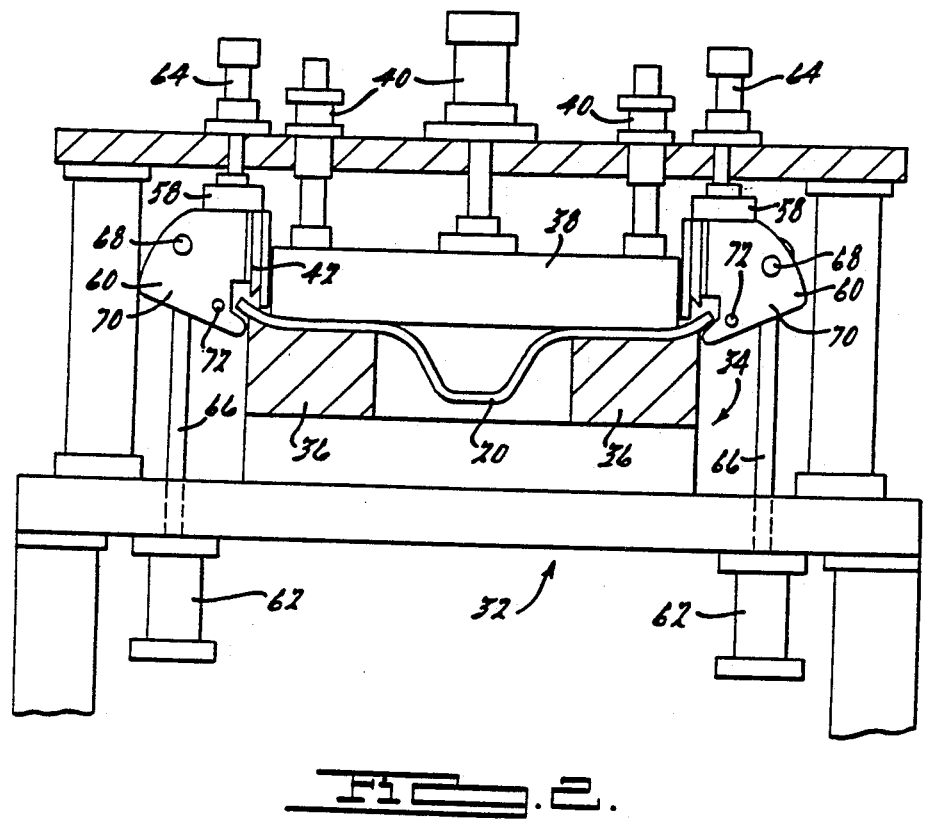
FIG. 2 is a vertical cross-sectional view of one embodiment of the trimming apparatus, illustrating an exemplary workpiece positioned for trimming.

FIG. 2 illustrates workpiece 20 positioned in a first embodiment of the trim cutting apparatus 32. The workpiece 20 is seen in edge view, better showing the three-dimensional contoured nature of the workpiece.

Trim cutting apparatus 32 comprises a workpiece holding fixture 34 which includes lower supporting blocks 36 and pneumatically assisted upper clamping block 38. The pneumatic clamping devices are illustrated at 40.

Figure 3:
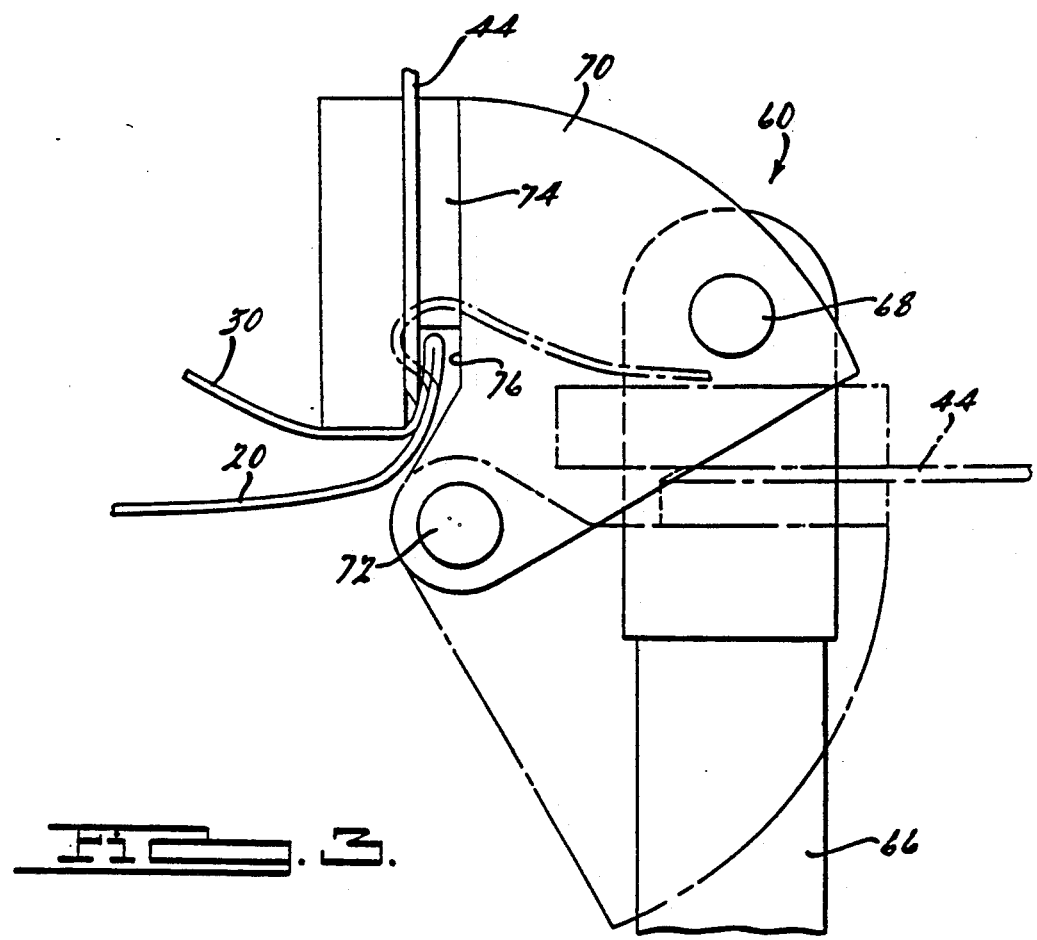
FIG. 3 is a detailed vertical cross-sectional view of the embodiment of FIG. 2 illustrating the cutting blade assembly fixture in greater detail.
Figure 4:
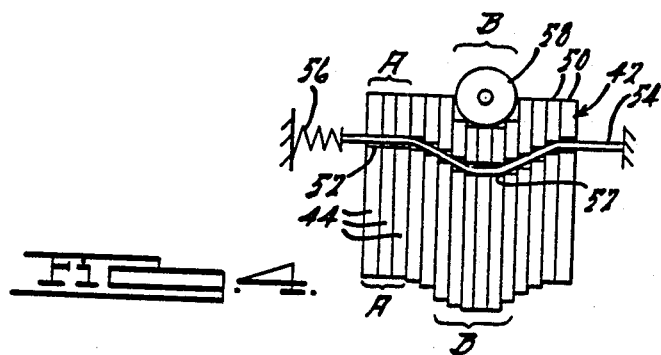
FIG. 4 is a close-up view illustrating the cutting blade assembly and roller.

The invention employs a segmented blade assembly 42 which is also shown in FIGS. 3 and 4. As perhaps best shown in FIG. 4, the segmented blade assembly comprises a plurality of individual blade segments 44. The blade segments are arranged side-by-side and follow a line, curve or contour defined by the contour 28 of the workpiece to be trimmed. As illustrated, the blade segments are substantially narrower in width than in length. In the presently preferred embodiment, the blade segments are nominally 0.187 inches in width and can be on the order of 10½ to 2 inches long. Of course, the blades can be made in other lengths and widths to suit the particular application.

With momentary reference to FIGS. 11 and 12, each blade segment comprises an elongated blade shaft 46 which is generally diamond-shaped or square in cross section (see FIG. 12). A blade is formed at one end 48 generally as shown. Referring to FIG. 12, the blade extends across one diagonal of the diamond-shaped cross section. The opposite end 50 is substantially flat. At an intermediate position, shaft 46 is provided with a notch or aperture 52.

Referring back now to FIG. 4, the blade segments 44 are aligned so that all notches 52 lie in the same plane when not in use. More specifically, when the blade segments are all positioned with blade ends in the noncutting or at rest position, apertures 52 line up with one another to receive tension wire 54. Tension wire 54 is pulled taut by a spring mechanism 56 which tends to hold the blades in the generally aligned, noncutting or resting position shown generally at A. As will be more fully explained, the blades are urged into a cutting position by force provided by a roller 58. Blades in the cutting position are shown generally at B. The presence of roller 58 forces blade segments into the cutting position against the back tension provided by tension wire 42 and spring mechanism 56. As will be explained, the roller is rolled or urged in a transverse direction relative to the longitudinal dimension of the blade segments so that it sequentially contacts the opposite ends 50 of each of the blade segments. This causes a wave-like cutting motion to progress from blade segment to blade segment in the direction of roller movement.

The trim cutting apparatus 32 illustrated in FIG. 2 has blade segments which are mounted on a pivoting blade fixture 60. The blade fixture 60 is shown in greater detail in FIG. 3. Blade fixture 60 holds the blades in one of two positions, an open, workpiece accessing position and a closed, cutting position. The cutting position is shown in FIG. 2. In FIG. 3, the cutting position is shown in solid lines and the open position in dashed lines. Actuator 62 (FIG. 2), which may be hydraulic, pneumatic, mechanical or electromechanical, moves the blade fixture between the two positions. In the open position, the workpiece may be readily inserted for trimming or removed after trimming. In the closed position the blades are oriented generally vertically for cutting. Rollers 58 are seen in FIG. 2 in contact with the blade segments. The rollers are pressed into contact with blade segments 42 by pneumatic or mechanical actuators 64, which apply pressure to the rollers. Preferably, the roller pressure is on the order of 60 pounds per 100/1,000th of linear width of the cutting blade.

The rollers are preferably made of a resilient material such as urethane rubber, preferably having a shore A, 40 durometer resilient rolling surface. By controlling the pressure on the blades and by providing a proper resilient rolling surface, adequate cutting pressure is delivered to the blades without generating too much pressure which would cut through or damage the substrate of the workpiece.

As better seen in FIG. 3, the blade fixture 60 is connected to actuators 62 through linkage 66 which is in turn coupled to coupling pin 68. The blade fixture has a body portion 70 which is pivoted for rotation about pivot pin 72. The holder supports the blade segments in a chuck 74 which has a recessed portion 76 to accept the end of the workpiece 20. When the blade fixture is in the closed or cutting position, the offall 30 of workpiece 20 is folded inwardly by virtue of being captured in recess 76. After the blade assembly has made its cut entirely along the contour to be cut, the offall falls into the center of the workpiece where it may be readily removed as the workpiece is being removed.

With reference to FIG. 2, roller 58 has been shown diagrammatically, without showing details such as the roller axle and drive mechanism. It will be understood that roller 58 may be provided with an axle having a lateral extension, like that of a paint roller, which in turn couples to a chain driven or cable driven carriage similar to that shown in FIGS. 5 and 9. Actuation of the pneumatic actuator 64 would act through the carriage mechanism and axle in order to apply pressure to roller 58.

In order to provide clearance to permit the body 70 to be withdrawn to the open or loading position, pivot pin 72 can be mounted for sliding movement on a cam track which would move diagonally as it is being pivoted to provide sufficient clearance for body 70 to clear roller 58.

Figure 5:
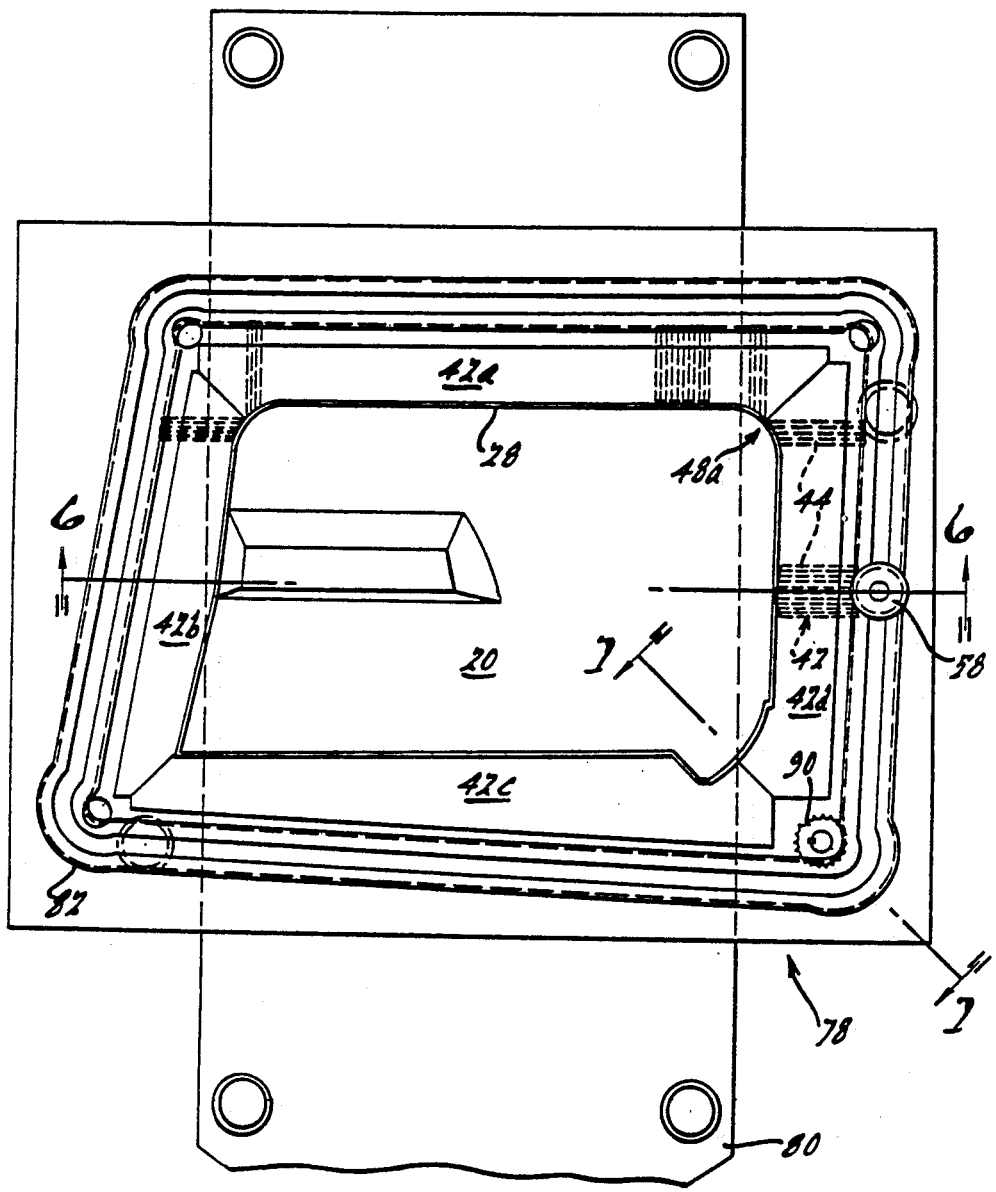
FIG. 5 is a plan view of another embodiment of the trimming apparatus, illustrating an exemplary workpiece position for trimming.
Figure 6:
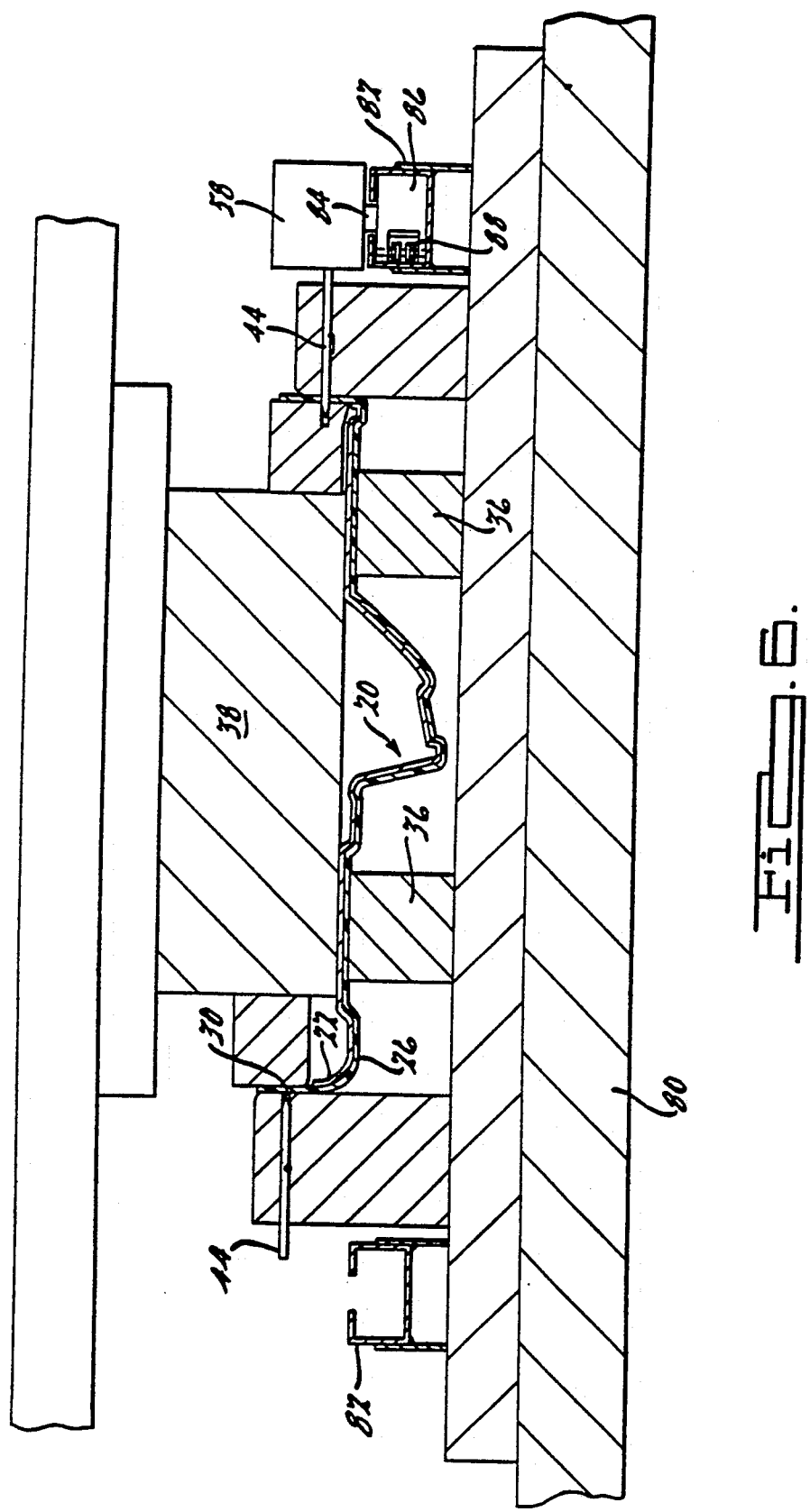
FIG. 6 is a vertical cross-sectional view taken substantially along the line 6—6 of FIG. 5.

Another embodiment of the invention is illustrated in FIGS. 5, 6 and 7. Referring first to FIG. 5, the trim cutting apparatus is shown generally at 78. The workpiece is illustrated generally at 20. A base 80 supports both the cutting apparatus and the workpiece in the manufacturing environment. As illustrated, the cutting apparatus comprises a track 82 which generally encloses the workpiece. The segmented blade assembly 42 is mounted inwardly of the track with the blades in a generally horizontal plane. Unlike the embodiment described above, the segmented blade assembly does its cutting in the horizontal position. The blade segments 44 are selected of an appropriate length to span the distance from the contour to be cut 28 to the track 82. As illustrated, the blade segments at the corners of the track and workpiece have angled cutting blade ends 48A. For the workpiece illustrated in FIG. 5, four separate blade assemblies 42A, 42B, 42C and 42D would normally be employed. In this fashion, each blade assembly comprises a plurality of blade segments laid side-by-side and generally parallel to one another. Thus, it will be understood that blade assemblies 42A, 42B, 42C and 42D follow and circumscribe the full contour 28 of the workpiece.

Disposed in track 82 is one or more rollers 58 constructed preferably of urethane or another resilient material having the properties described above in connection with the embodiment of FIGS. 2-4. Roller 58 travels around track 82 by means of a chain drive mechanism described below. As the roller circumnavigates the track, it depresses the blade segments in sequence to effect the cutting operation. FIGS. 6 and 7 illustrate the roller and chain drive mechanism in greater detail. As seen in FIG. 6, workpiece 20 is held in place by means of supporting blocks 36 and clamping block 38. As shown, workpiece 20 comprises substrate 22 and covering material 26 with the excess portion or offall illustrated at 30. Roller 58 is journaled for rotation as at 84. Roller 58 is driven around track 82 by drive linkage coupler 86 which is connected to chain drive 88.

FIG. 7 shows the chain drive mechanism in greater detail. The chain drive mechanism includes chain drive 88 which is driven by sprocket 90 (also shown in FIG. 5). Sprocket 90 is coupled through a drive shaft 92 to a conventional motor (not shown).

Yet another embodiment of the invention is illustrated in FIGS. 8, 9 and 10. This embodiment uses an alternate drive mechanism. Instead of the track and chain drive mechanism, the invention may be practiced using a pulley driven carriage illustrated in FIGS. 8 and 9. The carriage 94 carries roller 58 which is positioned to supply pressure to the blade segments 44. Roller 58 may be fabricated from urethane rubber or another resilient material having the characteristics described above. Roller 58 is journaled about axle 96 which is positioned in a yoke 98. Springs 100 apply a force on axle 96 in the longitudinal direction of the blade segments. The springs provide the proper pressure for cutting the covering material, preferably on the order of 60 pounds of force per 100/1,000th of blade. FIG. 10 illustrates a blade segment 44 in contact with roller 58. Note the tension wire 54, shown in cross section.

The carriage 94 is connected to a pair of cables or chains 102 which are in turn wrapped around pulleys 104. A motor drive unit 106 is provided for driving the pulleys which in turn cause the carriage to travel along the contour to be cut.

The embodiments described above are well calculated to effect efficient automated trimming of a workpiece without damaging the underlying substrate. In accordance with the inventive method, the trimming apparatus operates as follows. First the workpiece to be cut is positioned in the trimming apparatus and clamped in place. In the embodiment shown in FIGS. 2 and 3, the segmented blade assembly is then moved into position using actuators 62. Once the workpiece is properly in position, the blade ends 48 of the blade segments are positioned adjacent the contour to be cut 28. Because the blade segments are quite narrow and because of the flexibility afforded by the tension wire structure, the blade assembly can be made to follow virtually any curved or irregular contour Next, the roller 58 is caused to roll across the segmented blades creating a wave-like cutting action which cuts into the covering material, severing it. By controlling the force applied to the roller and because of the resiliency of the roller, the cutting pressure delivered through the blade segments is closely controlled, sufficient to cut through at least three layers or folds of covering material, but insufficient to score the substrate beneath. This is particularly advantageous for some workpieces which by their nature have puckered or folded edges due to tight corners or complex curves.

As the roller moves along the contour to be cut, the blade segments spring back into their resting position after cutting, due to the return force provided by tension wire 54. When the roller or rollers have made a complete traverse of the contour to be cut, the workpiece can be extracted from the apparatus and the offall removed. In the case of the embodiment illustrated in FIGS. 2 and 3, removal of the workpiece is effected by first returning the blade assemblies to the open position prior to removal.

From time to time it may be necessary to replace one or more blade segments as they become dull. This is quite easily done by pulling the tension wire laterally outwardly from the aperture 52 so as to free the blade from the assembly. The blade may then be lifted upwardly from the blade fixture and a new blade inserted. The new blade is then held in place with its aperture 52 in line with the apertures of adjacent blades and the tension wire is then released, so that it snaps back in place and engages the aperture of the new blade, holding it in place.

Figure 13:
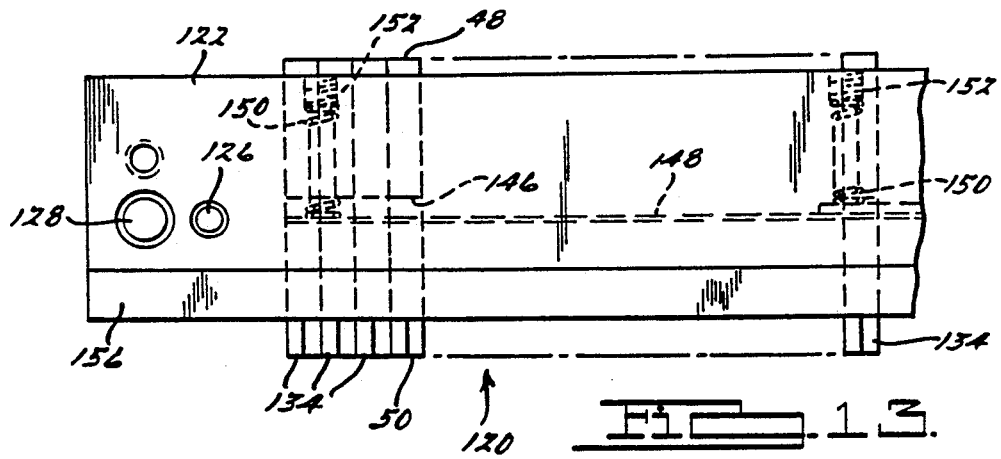
FIG. 13 is a side view of an alternate cutting blade assembly.
Figure 14:
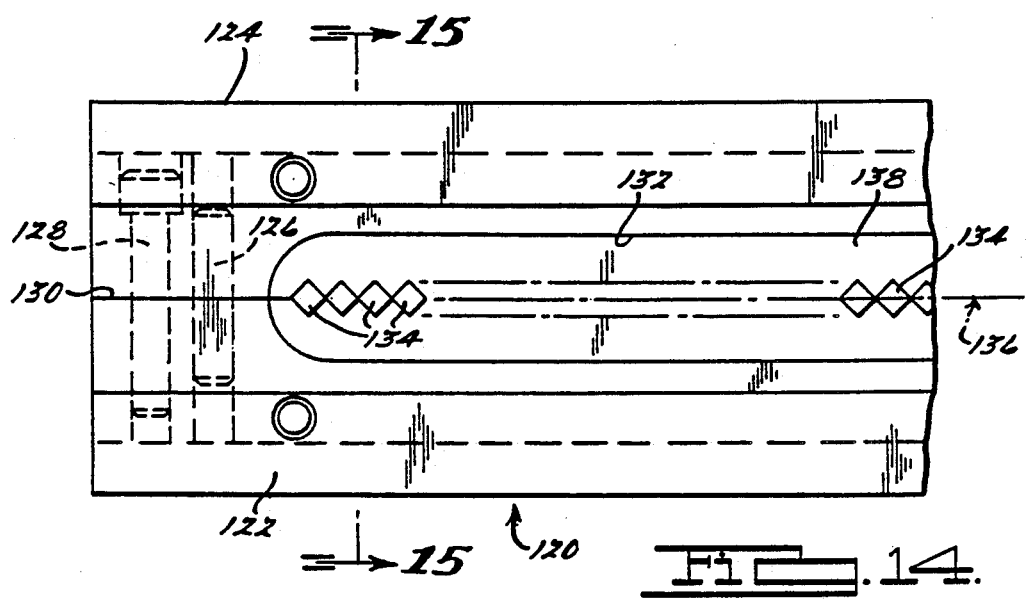
FIG. 14 is a top view of the cutting blade assembly of FIG. 13.
Figure 15:
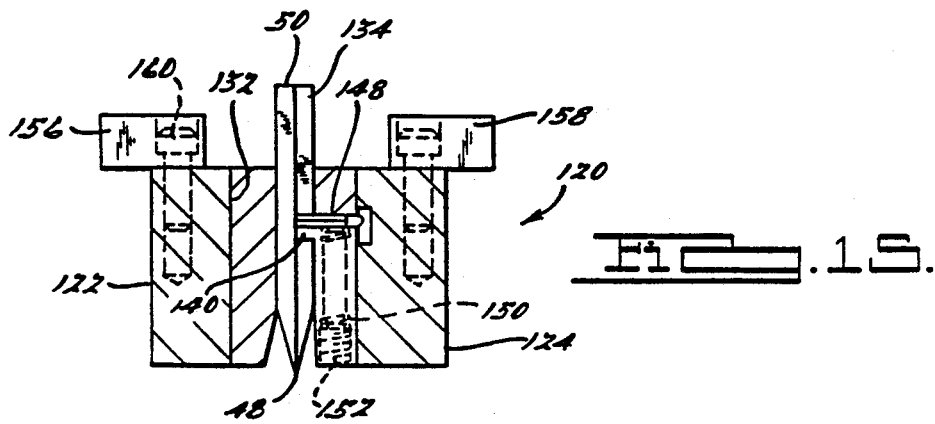
FIG. 15 is a cross-sectional view of the cutting blade assembly of FIGS. 13 and 14, taken substantially along the line 15—15 of FIG. 14.

Referring to FIGS. 13, 14 and 15, an alternate blade assembly is illustrated. This alternate blade assembly, shown generally by reference numeral 120 may be adapted for use with any of the previously described mechanisms by which the blades are sequentially activated into cutting engagement with the workpiece.

The alternate blade assembly 120 comprises first and second clamping members or guides 122 and 124. The clamping members are adapted to be secured together as with alignment pins 126 and bolts 128. The clamping members are cut away or hollowed out along the clamping interface 130 to define a pocket or channel 132. The individual blade segments 134 are positioned along a line 136 which defines the contour to be cut. The line 136 is preferably centered or positioned within pocket 132 and pocket 132 is filled with a suitable material such as urethane plastic which can be poured in a liquid state into pocket 132 and allowed to cure with the blade segments 134 in place. The urethane plug 138 thus defines a blade segment guide in which the individual blade segments may reciprocate along their longitudinal axes during cutting. Preferably the plug 138 is of a pourable material which does not appreciably shrink when cured and hardened and which also provides a suitably wearing and self-lubricating surface for supporting and guiding the blade segments. Although urethane is presently preferred, other materials can be used.

The illustrated embodiment of FIGS. 13, 14 and 15 depicts blade segments 134 disposed along a generally straight line 136. In order to accommodate curved contours, the clamping members can be suitably curved and the pocket likewise suitably curved to follow the desired curved contour. The presently preferred clamping members are metal, although other rigid structures such as reinforced plastics and rigid plastics can also be used.

Figure 16:
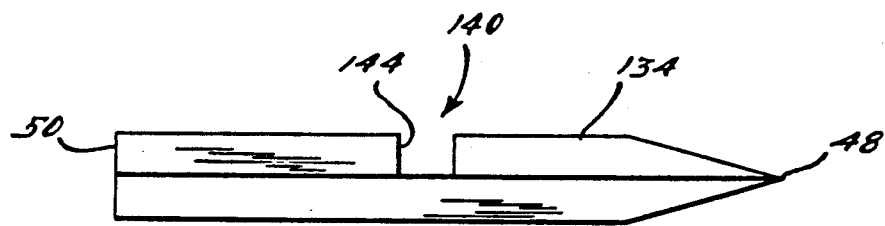
FIGS. 16 and 17 illustrate alternate single blade segments suitable for use in the cutting blade assemblies of FIGS. 13, 14 and 15.
Figure 17:
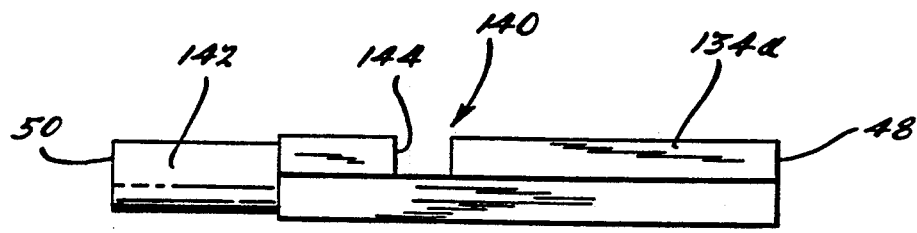

Blade segments 134 are modified somewhat from the configuration described in FIG. 11 to include a transverse slot 140. FIGS. 16 and 17 depict blade segments 134 and 134a which have slots 140 for use in the alternate blade assembly 120. FIG. 16 illustrates a blade segment 134 having a rectilinear, square or diamond-shaped end 50 opposite the blade end 48. The blade segment 134a of FIG. 17 has an opposite end 50 which forms a cylindrical shaft or pilot shaft 142 of circular cross section.

Slot 140 is preferably cut generally orthogonal to the longitudinal axis of the blade and such that it provides a planar surface 144 which is likewise orthogonal to the longitudinal axis of the blade segment. The transverse slots are cut so that when the blade segments are situated in proper side-by-side relationship along the contour to be cut, the slots all line up to define a channel 146 for receiving an elongated spring steel member 148.

The spring steel member is preferably of a sufficient length to span several blade segments and acts as a force distribution means for causing longitudinal roller pressure to urge a plurality of adjacent blade segments into contact, or near contact, with the workpiece. In the presently preferred embodiment the spring steel member is approximately 6 inches in length and approximately ½ inch in width and 1/16th inch in thickness. At suitable locations, preferably at each end of the spring steel member, coil bias springs 150 are provided. The coil bias springs are positioned in guide holes 152 in plug 138. The springs are held in place generally parallel to the longitudinal axis of the blade segments and contact the underside of spring steel member 148 to deliver a bias force which urges the spring steel member into engagement with planar surface 144 of the blade segments. To provide adequate clearance for the spring steel member the plug 138 can be milled to provide the required clearance to allow the spring steel member to move up and down.

In operation, the coil bias springs urge the spring steel member 148 into contact with the planar surfaces 144 of the respective blade segments 134. A downward pressure on a given blade segment or group of blade segments by means of a roller or the like causes the spring steel member to be forced downwardly against the bias spring forces. The spring steel member has a degree of resilience which permits it to flex and yet has sufficient stiffness so that blade segments adjacent to and in the near vicinity of the blade segment under actuation by the roller and preferably all of the segments contacted by the spring steel member will also be driven downwardly into contact with the workpiece. The slight resilience of the spring steel member permits individual blade segments to move upwardly somewhat, in order to conform to local irregularities in the surface of the workpiece. The spring steel member has the effect of lowering the force which must be applied to the roller in operation. This can be understood by reference to FIG. 4, which illustrates the blade segment embodiment employing a tension wire. With reference to FIG. 4, it will be seen that as the roller 58 is depressed downwardly and rolled laterally, the roller first makes contact with a blade segment not yet depressed along a radial which has a lateral vector component. In other words, the force applied by the roller to the blade segment about to undergo actuation has both a longitudinal component and a lateral component, the longitudinal component tending to force the blade into cutting engagement with the workpiece.

Using the alternate blade assembly 120 of FIGS. 13, 14 and 15, the longitudinal force of the roller acts upon the spring steel member to cause blade segments ahead of the current blade segment being forced into cutting engagement to also be urged longitudinally into contact with the workpiece. Thus the lateral vector component present during operation of the embodiment of FIG. 4 is largely eliminated and virtually all of the forces applied through the roller act in the longitudinal direction. The roller must therefore supply a longitudinal force adequate to flex the spring steel member sufficiently to allow the blade segment under the roller to cut through the workpiece. Thus the force applied to the roller must be adequate to flex the spring steel member the required cutting thickness distance and also to drive the cutting blade segment through the workpiece. Very little of the forces applied to the roller are wasted in a noncutting lateral vector component, due to the operation of the spring steel member. When the roller is positioned at a location at or near the location of one of the coil bias springs 150, the force applied to the roller must also be adequate to depress the spring steel member longitudinally against the force supplied by the spring.

With lateral forces upon the individual blade segments reduced, the noncutting ends 50 can be made of thinner dimensions. If desired, the noncutting ends or opposite ends 50 can be given a circular cross section as illustrated in FIG. 17. The circular cross section has been found to offer certain advantages in manufacturing blade assemblies. Other noncircular cross sections can also be employed.

Figure 18:
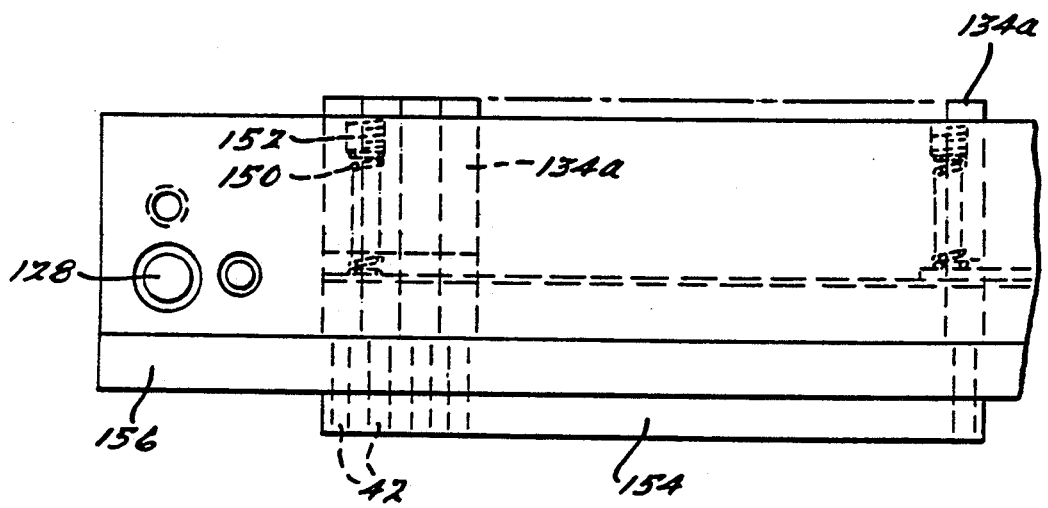
FIG. 18 illustrates a guide plate useful in making the cutting blade assembly of FIGS. 13, 14 and 15.

As illustrated in FIG. 18, the blade assembly 120 can be manufactured by drilling a plurality of appropriately spaced holes in a guide plate 154 along a line defined by the contour to be cut, with spacing determined by the blade segment width. Computer-aided manufacturing equipment and numerical control manufacturing equipment can be used for this purpose, whereby the contour to be cut is supplied as data to a computer system which computes the guide hole locations and causes the numerically controlled drilling apparatus to drill the proper holes. The cylindrical pilot ends 142 of blade segments 134a may then be inserted into the guide holes in guide plate 154 and rotated about the blade's longitudinal axis until the cutting blade ends 48 are properly oriented along the contour to be cut. If desired, a template having a score or channel cut in it to receive the blade ends and to define the contour to be cut can be used. Alternatively, the pilot 142 can be fabricated with a radial orienting means such as a keyway, notch, ovoid-shape or the like. Pilots having circular cross section are presently preferred because it is easier to drill circular guide holes in guide plate 154.

With the blade segments properly aligned and supported by guide plate 154, the first and second clamping members 122 and 124 are attached and the channel 132 is then filled with urethane to form the urethane plug 138. The guide plate 154 may then be removed and discarded, or it may be incorporated into the finished blade assembly.

The blade assembly 120 may then be attached to first and second tracks 156 and 158 by suitable means such as bolts 160. The tracks may in turn be attached by suitable means to one of the above-described structures for carrying the rollers for urging the blade segments into cutting engagement with the workpiece.

From the foregoing it will be seen that the present invention provides an apparatus and method for trimming along a contour of the workpiece. While the presently preferred embodiments are well calculated to fulfill the requirements of an automated trimming apparatus, it will be understood that the invention is susceptible to certain modification and change without departing from the spirit of the invention as set forth in the appended claims.

What is claimed is:

1. A method of trimming excess covering material from a workpiece along a contour comprising:
    positioning said workpiece adjacent a blade assembly comprising a plurality of blade segments arranged side by side and along a line defined by said contour;
    sequentially pressing a plurality of adjacent blade segments into contact with said workpiece and pressing at least one of said plurality of adjacent blade segments into cutting contact with said workpiece to sever said excess covering material from said workpiece;
    sequentially lifting said blade segments out of cutting contact with said workpiece following said sequentially pressing step; and
    separating said workpiece from said excess.

2. The method of claim 1 wherein said sequentially pressing step is performed by applying longitudinal force to said blade segments by rolling a roller across the ends of said blade segments.

3. The method of claim 1 wherein said sequentially lifting said blade segments is performed by applying lifting forces to said blade segments using an elongated force distribution means which contacts said blade segments.

4. A trimming apparatus for trimming along a contour of a workpiece comprising:
    a blade assembly positionable at least partially along a line defined by said contour to be trimmed;
    said blade assembly comprising a plurality of blade segments arranged side by side and along said line defined by said contour;
    a means for sequentially pressing a plurality of adjacent blade segments into contact with said workpiece and for pressing at least one of said plurality of adjacent blade segments into cutting contact with said workpiece to cause said blade segments to trim said workpiece; and
    a means for urging said blade segments out of cutting contact with said workpiece after said trimming has been effected.

5. The apparatus of claim 4 wherein said blade segments have a cutting end and an opposite end and wherein said blade assembly includes a blade retaining means for engaging said blade segments adjacent said opposite end.

6. The apparatus of claim 5 wherein said opposite end of said blade is positioned to receive pressing forces from said sequentially pressing means.

7. The apparatus of claim 4 wherein said means for sequentially pressing said blade segments comprises roller means for sequentially contacting and depressing said segments.

8. The apparatus of claim 7 further comprising means for urging said roller means in a direction followinq said contour.

9. The apparatus of claim 8 wherein said means for urging said roller includes track means for guiding said roller means at least partially along said contour.

10. The apparatus of claim 8 wherein said means for urging said roller includes flexible linkage drive means for guiding said roller means at least partially along said contour.

11. The apparatus of claim 10 wherein said flexible linkage drive means includes a chain drive means.

12. The apparatus of claim 10 wherein said flexible linkage drive means includes a cable drive means.

13. The apparatus of claim 7 wherein said roller means includes means for urging said roller means into contact with said blade segments with a predetermined force.

14. The apparatus of claim 13 wherein said means for urging said roller includes track means disposed a predetermined distance from said contour for guiding said roller means at least partially along said contour at a predetermined distance therefrom.

15. The apparatus of claim 13 wherein said means for urging said roller comprises at least one spring means for urging said roller means into contact with said blade segments.

16. The apparatus of claim 4 further comprising blade assembly fixture for carrying said blade assembly.

17. A trimming apparatus for trimming along a contour of a workpiece comprising:
a blade assembly positionable at least partially along a line defined by said contour to be trimmed;
said blade assembly comprising a pluraliity of blade segments arranged side by said and along said line defined by said contour, said blade segments defining a longitudinal dimension extending between a cutting end and a second end;
a roller means disposed adjacent said second end of said blade segments;
a means for moving said roller along said line to cause said roller to sequentially contact said second ends of said blade segments;
means for causing said roller means to exert longitudinal pressure on said blade segments as said roller is moved along said line; and
means for distributing said longitudinal pressure to a plurality of adjacent blade segments;
whereby said roller sequentially forces said blade segments into cutting contact with said workpiece.

18. The apparatus of claim 17 further comprising means for urging a given blade segment out of cutting contact with said workpiece when said roller means is not exerting longitudinal pressure on said given blade segment.

19. The apparatus of claim 17 wherein said roller means is comprises of resilient material.

20. The apparatus of claim 17 wherein said roller means is comprises of urethane rubber.

21. The apparatus of claim 17 wherein said roller means provides a shore A, 40 durometer resilient rolling surface.

22. The apparatus of claim 17 wherein said means for applying a force on said roller means comprises at least one spring means coupled to said roller means.

23. The apparatus of claim 17 wherein said means for applying a force on said roller means comprises track means positioned adjacent said blade segments a predetermined distance therefrom, for guiding said roller means along said line.

24. The apparatus of claim 17 wherein said distributing means comprises a spring steel means.

25. The apparatus of claim 24 wherein said distributing means includes spring means for urging said spring steel means generally in a direction opposing said longitudinal pressure.

26. The apparatus of claim 25 wherein said spring steel means and said spring means comprises means for urging said plurality of adjacent blade segments out of cutting contact with said workpiece when said roller means is not exerting longitudinal pressure on one of said plurality of adjacent blade segments.

27. A cutting blade assembly for a trimming apparatus comprising:
a plurality of elongated blade segments each segment having a longitudinally extending shaft and a cutting blade tip;
said segments being substantially greater in length than in width and being positioned side by side to follow a contour to be trimmed and being individually moveable between a resting position and a longitudinally displaced cutting position;
each of said segments having an aperture therein, said apertures being generally aligned with one another when said segments are aligned in said resting position;
an elongated force distribution means disposed through said apertures; and
spring means contacting said force distribution means for urging said force distribution means in a direction tending to cause said segments to return to said resting position after being displaced to said cutting position.

28. The cutting blade of claim 27 wherein said blade segments are nominally 0.187 inches in width.

29. The cutting blade of claim 27 wherein each of said blade segments has a second end opposite said cutting blade tip and further comprising a guide fixture having a plurality of apertures for slideably receiving said second ends of said blade segments, said second ends extending above the plane of said guide fixture when said segments are in said resting position.

30. A trimming apparatus for trimming along a contour of a workpiece comprising:
a blade assembly positionable at least partially along a line defined by said contour to be trimmed;
said blade assembly comprising a plurality of blade segments arranged side by side and along said line defined by said contour;
a means for sequentially pressing said blade to cause said blade segments to trim said workpiece;
a means for during said blade segments out of cutting contact with said workpiece after said trimming has been effected; and
further comprising blade assembly fixture for carrying said blade assembly.

31. A trimming apparatus for trimming along a contour of a workpiece comprising:
a blade assembly positionable at least partially along a line defined by said contour to be trimmed;
said blade assembly comprising a plurality of blade segments arranged side by said and along said line defined by said contour, said blade segments defining a longitudinal dimension extending between a cutting end and a second end;
a roller means disposed adjacent said second end of said blade segments;
a means for moving said roller along said line to cause said roller to sequentially contact said second ends of said blade segments;
means for causing said roller means to exert longitudinal pressure on said blade segments as said roller is moved along said line; and
whereby said roller sequentially forces said blade segments into cutting contact with said workpiece.

32. The apparatus of claim 31 wherein said means for applying a force on said roller means comprises at least one spring means coupled to said roller means.

* * * * *